(12) United States Patent
Kuwahara et al.

(10) Patent No.: US 7,369,717 B1
(45) Date of Patent: May 6, 2008

(54) OPTICAL INTERCONNECTION HARNESS

(75) Inventors: Kenji Kuwahara, Tokyo (JP); Takuro Miya, Yokohama (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/535,015

(22) PCT Filed: Dec. 18, 2003

(86) PCT No.: PCT/US03/41013

§ 371 (c)(1),
(2), (4) Date: Jun. 5, 2007

(30) Foreign Application Priority Data

Dec. 25, 2002 (JP) .............................. 2002-375114

(51) Int. Cl.
*G02B 6/12* (2006.01)
(52) U.S. Cl. ...................................................... 385/14
(58) Field of Classification Search .................. 385/14, 385/50, 55, 89, 98, 99, 137
See application file for complete search history.

(56) References Cited

U.S. PATENT DOCUMENTS

| | | | |
|---|---|---|---|
| 4,078,910 A * | 3/1978 | Dalgoutte | 385/98 |
| 4,923,268 A * | 5/1990 | Xu | 385/50 |
| 5,066,095 A * | 11/1991 | Dekeyser et al. | 385/99 |
| 5,185,840 A * | 2/1993 | Iapicco | 385/100 |
| 5,204,925 A * | 4/1993 | Bonanni et al. | 385/89 |
| 6,416,232 B1 * | 7/2002 | Sasaki et al. | 385/55 |
| 6,567,603 B1 * | 5/2003 | Sukegawa et al. | 385/137 |
| 6,839,475 B2 * | 1/2005 | Kawase et al. | 385/14 |

FOREIGN PATENT DOCUMENTS

| | | |
|---|---|---|
| JP | 7-281052 | 10/1995 |
| JP | 2001-141936 | 5/2001 |
| JP | 2001-147330 | 5/2001 |
| JP | 2002-174736 | 6/2002 |

OTHER PUBLICATIONS

English Language Translation of JP 2002-174736A, Completed on Dec. 19, 2007.*
English Language Translation of JP 2001-147330A, Completed on Dec. 19, 2007.*
English Language Translation of JP 2001-141936A, Completed on Dec. 19, 2007.*

* cited by examiner

*Primary Examiner*—Quyen P Leung
(74) *Attorney, Agent, or Firm*—Gregg H. Rosenblatt

(57) ABSTRACT

The present invention is directed to improving the yield in fiber terminating processing, and to preventing the occurrence of transmission loss due to stress concentration at an optical fiber bend or due to variations in ambient temperature. In one exemplary embodiment, a channel is sandwiched between adhesive layers and an optical fiber is passed through the channel.

7 Claims, 3 Drawing Sheets

OPTICAL INTERCONNECTION HARNESS

CROSS REFERENCE TO RELATED APPLICATIONS

This application is a national stage filing under 35 U.S.C. 371 of PCT/US2003/041013, filed Dec. 18, 2003, which claims priority to Japanese Patent Application No. 2002-375114, filed Dec. 25, 2002, the disclosure of which is incorporated by reference in its/their entirety herein.

FIELD OF THE INVENTION

The present invention relates to an optical interconnection sheet for arranging a large number of optical fibers in two dimensions.

BACKGROUND

Optical interconnection sheets for arranging a large number of optical fibers in two dimensions are disclosed, for example, in Japanese Patent No. 2574611 and Japanese Unexamined Patent Publication Nos. 2001-141936, 2001-147330, and 2002-174736. In any of these disclosed optical interconnection sheets, each individual optical fiber is directly bonded to a film by means of an adhesive or glue.

Japanese Unexamined Patent Publication No. 2001-147330 discloses reinforcing an optical fiber portion from an optical interconnection sheet (optical fiber sheet). The optical fiber was covered with a reinforcing tube and bonded to the sheet by sandwiching the tube between two sheets as shown in FIG. 4. However, the optical fiber portion fixed to the sheet via the reinforcing tube is only a portion of the optical fiber. The remaining larger portion of the optical fiber is directly bonded to the sheet.

The end portion of each optical fiber arranged on the optical interconnection sheet is subsequently connected to an optical connector or the like. Because the optical fiber is directly bonded to the film, if the fiber terminating process fails, the entire optical connection sheet including the other optical fibers will be rendered unusable, decreasing the fabrication yield. Therefore, the end portion of the optical fiber should be provided with an extra length allowing for such failure. Even with the extra length, the situation would be the same if the same failure was repeated.

Another problem may arise when the optical fiber is directly bonded to the film. Transmission loss may occur due to stress concentration at a fiber bend or due to a strain caused by differences in thermal expansion. Expansion arises when the materials expand or shrink due to temperature changes during a temperature test or changes in ambient temperature during use.

Thus, there is a need to provide an optical interconnection sheet that can improve the yield in fiber terminating processing, and can prevent the occurrence of transmission loss due to stress concentration at an optical fiber bend or due to variations in ambient temperature.

SUMMARY

Disclosed herein is an optical interconnection sheet comprising: at least one channel in which at least one optical fiber or an optical fiber ribbon cable is inserted for use; and a layered structure for maintaining the channel substantially in a two-dimensional plane by holding the channel in such a manner that both ends of the channel at least reach respective edges of the sheet.

The layered structure includes, for example, two adhesive layers for sandwiching the channel from both sides thereof.

Alternatively, the layered structure includes an adhesive layer on one side of the channel and a resin layer on the other side of the channel.

Preferably, the channel has an inner diameter and surface hardness that can maintain a gap to the optical fiber so as to allow the optical fiber to move within the channel when the optical fiber is being inserted therein.

The channel may be formed from a heat shrinkable tube or heat shrinkable channel.

Because the optical fiber is not fixed but is inserted in the channel, if the fiber termination process fails, it is only necessary to replace the optical fiber. This advantage improves the yield in fiber terminating process. Furthermore, if the ambient temperature changes, the optical fiber experiences little to no strain. And, stress concentration does not occur at a bend portion of the optical fiber.

BRIEF DESCRIPTION OF THE DRAWINGS

The invention can be better described with reference to the following figures, wherein.

These figures are not drawn to scale and are intended merely for illustrative purposes. In the figures, like reference numbers denote like items.

DETAILED DESCRIPTION

Figure 1:
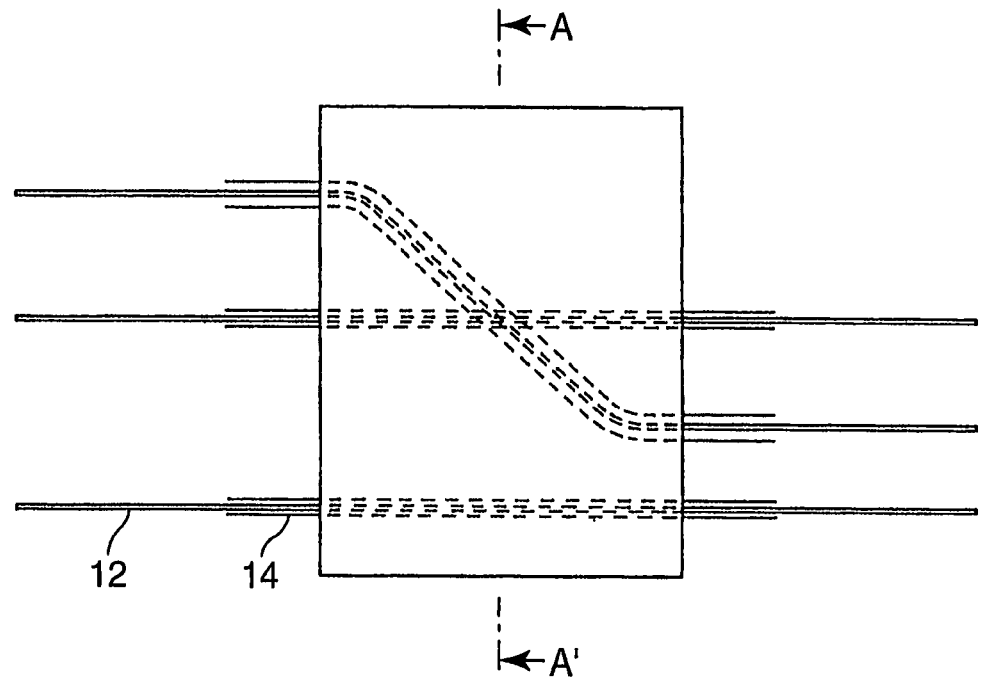
FIG. 1 is a plan view showing an exemplary embodiment of an optical interconnection sheet of the present invention.
Figure 2:
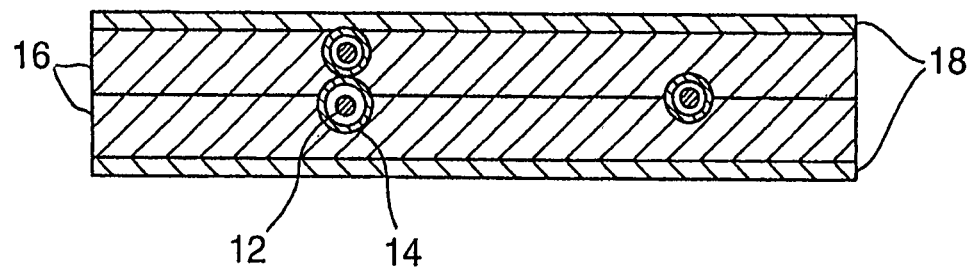
FIG. 2 is a cross-sectional view taken along A-A' in FIG. 1.

FIG. 1 is a plan view showing optical interconnection sheet 10 according to one exemplary embodiment of the present invention. FIG. 2 is a cross-sectional view taken along A-A' in FIG. 1. As can be seen from FIG. 2, the optical interconnection sheet has channels 14 each having an inner diameter larger than the outer diameter of optical fiber 12. The channels are sandwiched between adhesive layers 16. Disposed on the adhesive layer are films 18. Optical fiber 12 is passed through channel 14 with a gap maintained with respect to the inner wall of the channel. Channels 14 are arranged in a desired pattern. In the example shown in FIG. 1, two of three tubes overlap each other. The ends of each channel protrude beyond the respective edges of the sheet 10.

In one exemplary embodiment, each channel 14 has an inner diameter and surface hardness. Specifically, each channel has a surface strength of D50 to D80 as measured according to test method JIS K7215. A gap can be maintained between the optical fiber and the inner diameter of the channel as to allow free movement of the optical fiber within the channel. This free movement is present even in the structure of FIG. 1 where two channels are arranged to overlap each other.

Suitable material for use as the channel include but are not limited to polyacetal, nylon, fluororesin, PBT(polybutylene terephthalate), thermoplastic elastomer such as polyester elastomer, polypropylene, and polyethylene (hard and soft). The inner diameter of each channel 14 should be made not smaller than 1.1 times the diameter of the optical fiber in a straight pattern portion, and not smaller than 1.3 times the optical fiber diameter in a bend portion.

For the adhesive layers 16, a resin material having good resilience and flexibility can be used. Suitable examples include acrylate, urethane, epoxy, polyimide, polyethylene, silicone, ultraviolet light cured acrylate, and ultraviolet light cured urethane.

Films 18 are provided to remove the tackiness of the adhesive layers 16 for ease of handling. Suitable films include, but are not limited to, polyimide and polyethylene terephthalate (PET). One of the films may be formed from a separator sheet (i.e., a liner), which is removed for use so that the sheet can be bonded to a substrate or the like by making use of the tackiness of the underlying adhesive layer 16.

Although a silica fiber is used as optical fiber 12, a plastic fiber may be used as well.

The structure of the optical interconnection sheet of the invention is not limited to the example shown in FIG. 2 in which the channels are sandwiched between adhesive layers; for example, the channels may be arranged on an adhesive material, and the resulting structure may be coated or sealed with a resin, where the resin is not the adhesive material, i.e., where the resin is a different material than the adhesive material.

Figure 3:
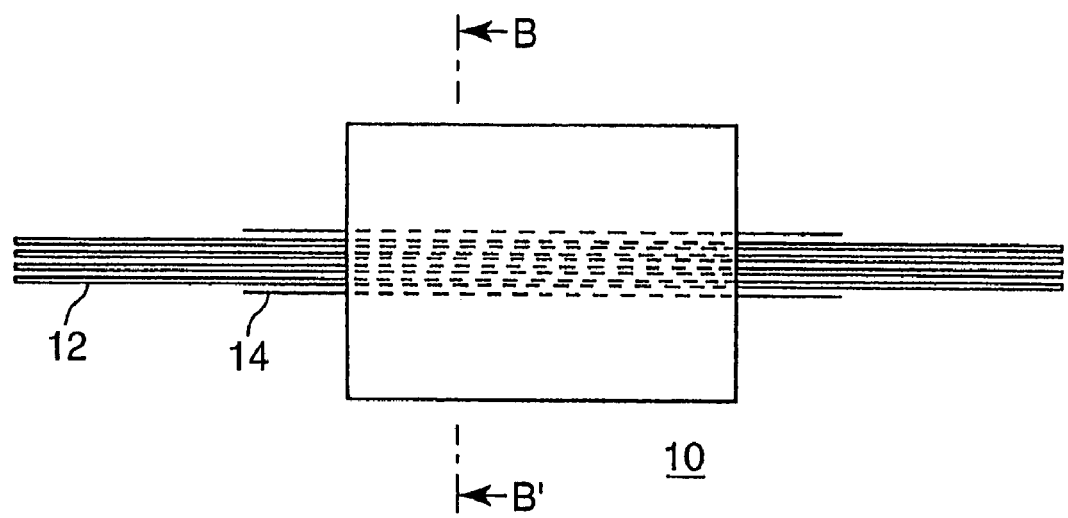
FIG. 3 is a plan view showing another exemplary embodiment of an optical interconnection sheet of the present invention.
Figure 4:
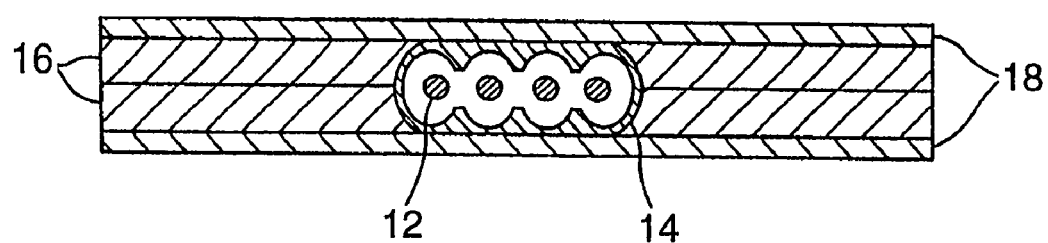
FIG. 4 is a cross-sectional view taken along B-B' in FIG. 3.

FIG. 3 is a plan view showing an optical interconnection sheet according to another exemplary embodiment of the present invention, and FIG. 4 is a cross-sectional view taken along B-B' in FIG. 3. As shown in FIG. 4, a plurality of optical fibers 12 are inserted in channel 14, which has been sandwiched between adhesive layers 16. In one embodiment, a plurality of optical fibers 12 are used. In another embodiment, a fiber ribbon cable made of a plurality of optical fibers arranged side by side and fastened together to form a flat tape-like structure may be used.

Figure 5:
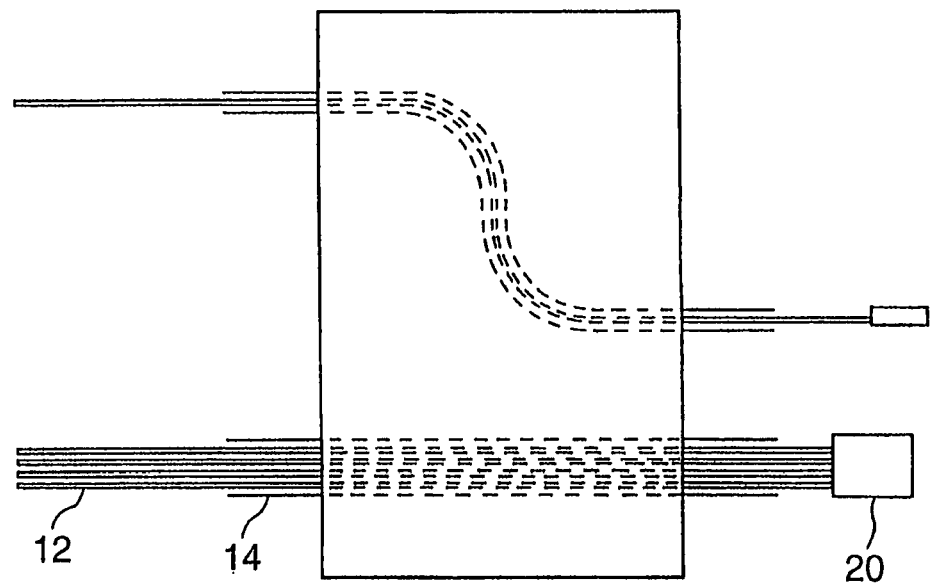
FIG. 5 is a plan view showing yet another exemplary embodiment of an optical interconnection sheet of the present invention.

FIG. 5 is a plan view showing an optical interconnection sheet of yet another embodiment of the present invention. In the embodiment of FIG. 5, an optical fiber 12 that has been terminated to one end to optical connector 20 is inserted in channel 14. If desired, another optical device or the like can be connected to the other non-terminated end of optical fiber 12.

Figure 6:
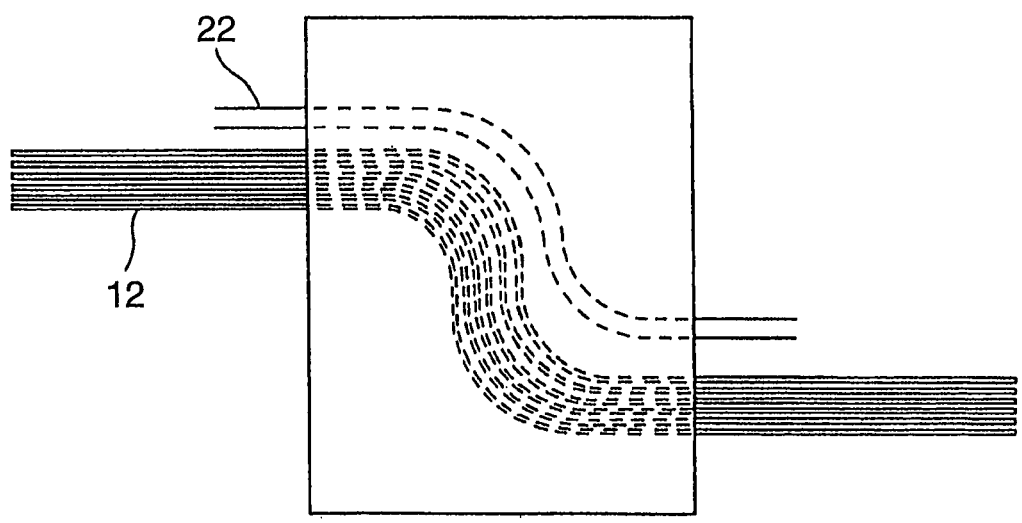
FIG. 6 is a plan view showing yet another exemplary embodiment of an optical interconnection sheet of the present invention.

FIG. 6 is a plan view showing an optical interconnection sheet of yet another embodiment of the present invention. In the embodiment of FIG. 6, channel 22 provides a backup path for the plurality of optical fibers 12. If any one of the plurality of optical fibers 12 becomes faulty, the communication path can be maintained by passing a new optical fiber through backup channel 22.

A heat shrinkable tube may be used as the channel 14 or 22. In that case, after the ends of the optical fibers have been processed, the heat shrinkable tube is heated and shrinks around the optical fibers. This process holds the optical fiber fixed in the optical interconnection sheet and improves the yield in fiber terminating processing.

Preferably, each channel or heat shrinkable tube is formed from a flame retardant material, depending on its use environment. Each channel or heat shrinkable tube may be colored to facilitate discrimination between the plurality of optical fibers brought out from the end faces of the optical interconnection sheet.

In one exemplary embodiment, each channel 14, 22 or heat shrinkable tube is arranged with its ends protruding beyond the end faces of the sheet, as shown in FIGS. 1, 3, 5, and 6, but this is not an essential requirement. The only requirement is that each tube be arranged in such a manner that its ends at least reach the respective end faces of the sheet.

There are several advantages to the present invention.

For example, because the optical fiber is inserted in the channel, the inserted optical fiber can be removed if necessary. As a result, the optical fiber extending from the optical interconnection sheet need not be provided with an extra length.

Also, because a defective fiber can be removed and a new optical fiber inserted, reparability in the fiber end processing improves, increasing the fabrication yield of the optical interconnection sheet.

The length of the optical fiber extending from the optical interconnection sheet can be adjusted after the optical fiber is inserted in the channel.

Because the optical fiber is movable within the optical interconnection sheet, stress applied to a fiber bend can be alleviated.

Optical fibers can be inserted in channels that overlap with the other. This alternative serves to avoid the bending stress that occurs when the optical fibers are arranged one overlapping the other.

By making the channel protrude from the optical interconnection sheet, the protruding portion of the optical fiber, as well as the portion of the optical fiber at the junction with the optical interconnection sheet, can be protected.

Because the optical fiber is not in direct contact with the adhesive material, the stress to which the optical fiber is subjected due to environmental changes can be alleviated.

The optical fiber can be inserted in the channel after the latter is mounted on the adhesive material. This process serves to avoid the pressing stress that would be applied to the optical fiber if the optical fiber were fixed to the adhesive material.

The channel with the optical fiber already inserted therein can be mounted on the adhesive material. The channel serves to protect the optical fiber and alleviate the stress applied to the optical fiber during installation.

What is claimed is:

1. An optical interconnection sheet comprising:
   (a) at least one channel in which at least one optical fiber or an optical fiber ribbon cable can be inserted for use; and
   (b) a layered structure for maintaining the at least one channel substantially in a two-dimensional plane by holding the channel in such a manner that both ends of the channel at least reach respective edges of the optical interconnection sheet.

2. An optical interconnection sheet according to claim 1, wherein the layered structure includes two adhesive layers sandwiching the at least one channel.

3. An optical interconnection sheet according to claim 1, wherein the layered structure includes an adhesive layer on one side of the at least one channel and a resin layer on the other side of the at least one channel.

4. An optical interconnection sheet according to claim 1, wherein the at least one channel has an inner diameter and surface hardness so as to maintain a gap between the inner diameter of the at least one channel and the at least one optical fiber as to allow the at least one optical fiber to move within the at least one channel when the at least one optical fiber is being inserted therein.

5. An optical interconnection sheet according to claim 1, wherein the at least one channel comprises a heat shrinkable channel.

6. An optical interconnection sheet according to claim 1, further comprising at least one optical fiber or an optical fiber ribbon cable inserted in at least one of the channels.

7. An optical interconnection sheet according to claim 1, further comprising at least one optical fiber directly held in the layered structure.

* * * * *